United States Patent [19]

Steingroever et al.

[11] 4,160,208

[45] Jul. 3, 1979

[54] METHOD OF CALIBRATING MAGNETIC THICKNESS GAUGES

[75] Inventors: Erich A. Steingroever, Bonn; Hans F. Nix, Cölogne, both of Fed. Rep. of Germany

[73] Assignee: Elektro-Physik, Hans Nix & Dr. -Ing E. Steingroever KG., Cölögne, Fed. Rep. of Germany

[21] Appl. No.: 652,669

[22] Filed: Jan. 27, 1976

[51] Int. Cl.² .......................................... G01R 35/00
[52] U.S. Cl. ..................................... 324/202; 324/230
[58] Field of Search .................. 324/34 R, 34 TK, 40

[56] References Cited

U.S. PATENT DOCUMENTS

| | | | |
|---|---|---|---|
| 2,749,505 | 6/1956 | McNary | 324/34 TK |
| 3,582,772 | 6/1971 | Hammer | 324/40 |
| 3,815,016 | 6/1974 | Nix et al. | 324/34 TK |

*Primary Examiner*—Robert J. Corcoran
*Attorney, Agent, or Firm*—Fisher, Christen & Sabol

[57] ABSTRACT

The calibration of magnetic gauges used for measuring the thickness of a layer applied to a base can be accomplished by the use of a test sheet composed of an essentially uncoated material which exerts a lesser influence on the gauge for a given thickness than the material comprising the base upon which the measured layer is applied. An uncoated test sheet of a certain thickness, when brought into contact with the pole piece of a thickness gauge, will produce a reading equivalent to that produced when the gauge measures a layer of predetermined thickness applied to the usual base material. For calibrating a gauge used to measure the thickness of a non-magnetic layer on a ferromagnetic base, the test sheet may be a material of less magnetic conductivity, permeability and/or saturation than that of the usual base material. A non-limitative example of a material suitable for use as a test sheet is pure nickel. Where the gauge is to be used to measure the thickness of non-conductive layers on a conductive base, the test sheet may comprise an uncoated sheet of a material of less conductivity than that of the base material.

8 Claims, 4 Drawing Figures

METHOD OF CALIBRATING MAGNETIC THICKNESS GAUGES

The present invention relates to magnetic gauges used for the measurement of the thickness of a layer applied to a base, especially a non-magnetic layer applied to a ferromagnetic base and, more particularly, the invention relates to a method for calibrating gauges of this type.

Generally, the principles of operation of gauges of this type fall into three categories, namely:

I. Gauges in which the attractive force between the ferromagnetic base and a permanent magnet in contact with the deposited non-magnetic layer is utilized; the thickness of the layer being an inverse function of the attractive force. Gauges of this type are disclosed in prior U.S. Pat. Nos. 3,521,160; 3,699,487, and; 3,761,804 (FIG. 1).

II. Gauges in which a flux path is produced by the measuring instrument which passes through the layer to be measured and the ferromagnetic base so that variations in the value of that flux path serve as a measurement of the thickness of the applied layer. Gauges of this type are disclosed in prior U.S. Pat. Nos. 3,440,527 and 3,761,804 (FIG. 3).

III. Gauges in which one of the electrical characteristics, such the voltage, of a circuit used to generate an alternating magnetic field is varied as the magnetic field approaches the magnetic base. A gauge of this type is disclosed in FIG. 4 of U.S. Pat. No. 3,761,804, wherein a coil surrounding a magnetic pole piece is energized by alternating current, the end of the pole piece being placed in contact with the layer to be measured, and changes in thickness of the layer being reflected by voltage changes in a bridge circuit connected with the coil. Gauges of this type can also be used for measuring the thickness of a layer of non-conductive material on a conductive base, in which situation, the electrical values of the circuit associated with the pole piece result from changes in the eddy currents produced by the alternating field.

In the known methods of calibrating magnetic thickness gauges, it has always been considered necessary to use a test calibration sheet composed of a base material similar to the base material with which the gauge is to be used, with the test sheet being coated with a deposited layer of material similar to that of the material to be measured. In other words, for calibrating a thickness gauge to be used for the measurement of paint, or lacquer, coated on a ferromagnetic material, such as steel, the test sheet comprised a sheet of steel having a coating on one surface thereof of paint of lacquer of a specific known thickness.

There are a number of disadvantages inherent in the use of test sheets of this type, not the least of which is the fact that it is expensive and extremely difficult to produce a coating on a sheet of base material which is of an exact thickness. That is to say, while it is relatively easy to coat a sheet of metal with a layer of paint, or enamel, and to measure the thickness of that coating by means of a previously calibrated thickness gauge so that that test sheet can be used to calibrate further thickness gauges, such a test sheet is not easily reproduced if it becomes lost or is destroyed. Another disadvantage of these prior art test sheets is the fact that the coatings are not very durable and are subject to destruction resulting from scratching, abrasion or becoming covered with coatings of dirt and grime with the result that they are no longer accurate.

Therefore, it is an object of the present invention to overcome the above-mentioned disadvantages in the calibration of thickness gauges by the utilization of a test sheet of a material of uniform composition throughout its thickness which produces an effect on the thickness gauge which is equivalent to the effect produced by a prior art test sheet having a material of known thickness deposited on a base. In other words, an uncoated test sheet of a material having specific known characteristics is substituted for the usual test calibration sheet. Since the test sheet of the present invention is uncoated, it is more durable and can be more readily reproduced since all that is necessary is to ensure that the successive test sheets are of identical thickness with the original test sheet.

For this purpose, it has been found that, in the case of calibrating an instrument used to measure the thickness of layers on ferromagnetic supports, it is possible to substitute a substantially uncoated, homogeneous sheet of a material having a value of magnetic conductivity, permeability and/or magnetic saturation, which is less than that of the material comprising the bases upon which the layers are to be measured. Alternatively, in the case where the measured layers are applied to a base of an electrically conductive material, the test sheet may be of any one of a number of available materials whose values of electrical conductivity are less than that of the base in question.

Other objects and advantages will be obvious to those skilled in the art after reading the following specification in connection with the annexed drawings, in which FIG. 1 is a schematic view showing the method of calibration of a thickness gauge using the standard test sheet of the prior art in which a layer of known thickness has been applied to a base;

Figure 1:
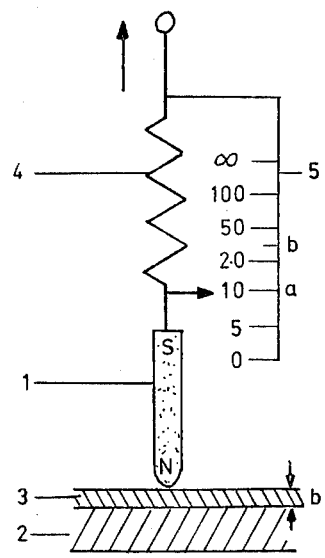

The customary method of calibrating a magnetic thickness gauge is schematically shown in FIG. 1, in which an elongated permanent magnet 1 is shown, having N and S poles, suspended from a spring 4 with one end of the magnet in contact with the surface of the prior art type of test sheet which comprises a layer 3 having a known thickness b applied on a base support 2. The force required to pull the magnet 1 away from the layer 3 is measured on the scale 5 which is attached to the support from which spring 4 is suspended. The position of the pointer on the scale, when the magnet is suspended in free space, away from any outside magnetic influence, represents the reading which would be obtained when measuring a layer of infinite thickness.

The condition shown in FIG. 1 is that which exists when the magnet is fully magnetized, in which case, the spring 4 will be extended so that the pointer will move from the reading of ∞ to a point on scale 5 which is represented by the letter a. However, as described in U.S. Pat. No. 3,521,160, in order to adjust the magnetic adhesive force to the spring tension, the magnet 1 is preferably partially demagnetized so that the force required to pull the magnet away from the layer 3 having a thickness b is somewhat less than when it is fully magnetized and is indicated on the scale by the mark b.

Figure 2:
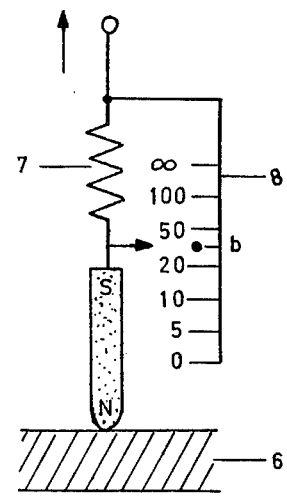
FIG. 2 is a schematic view showing the calibration of a thickness gauge using a test sheet of a substantially uncoated material which produces an effect on the gauge which is equivalent to a deposited layer of known thickness.

The method of calibration according to the present invention is shown in FIG. 2, in which the test sheet 6 comprises an uncoated material of uniform composition throughout, which may consist of a sheet of pure nickel having a saturation magnetization wherein Js equals 0.62 Tesla. The thickness of this sheet is chosen such that its attraction influence on the magnet will be the equivalent of that of the test sheet of FIG. 1 which consisted of the ferromagnetic base 2 with a non-magnetic layer 3. In this case, after the magnet supported by spring 7 has been fully magnetized, it is subjected to demagnetization until the force required to pull the magnet away from the test sheet 6 in the direction of the arrow is such that the pointer will move down to the calibration reading b on the scale 8.

Figure 3:
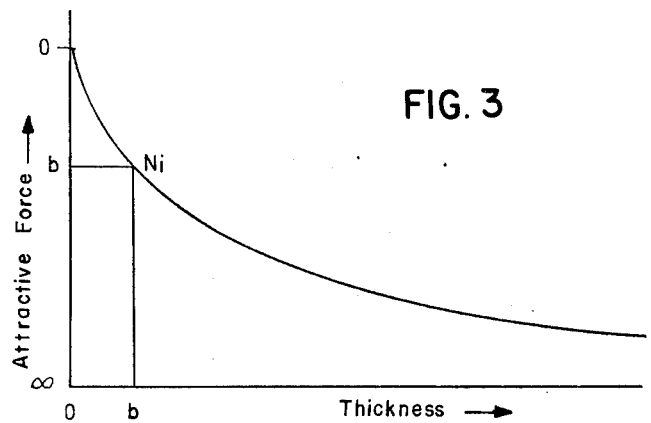
FIG. 3 is a diagram showing the typical curve which represents the relationship between the thickness of a measured layer, plotted horizontally, and the attractive force of a magnet, plotted vertically.

A typical curve for the scale of a magnetic gauge for measuring the thickness of layers of non-magnetic material on an iron base is shown in FIG. 3, in which the values of attractive force—the force required to pull a magnet away from the surface of a layer applied to the base—is shown on the vertical scale, and the thickness of the layers are plotted horizontally. The calibration point b for use with a nickel test sheet, preferably lies in that portion of the curve having a medium slope where the calibrating process can be most accurately accomplished. The thickness of the test sheet of uniform material is immaterial so long as its equivalent magnetic influence will result in positioning of the calibration point, or mark, in that portion of the curve having a medium slope. Once the calibration point has been marked on the scale of a thickness gauge for use with a test sheet of a material of a uniform composition having a certain known thickness, the calibration of other similar gauges can be carried out by using any test sheet of identical composition and thickness.

Figure 4:
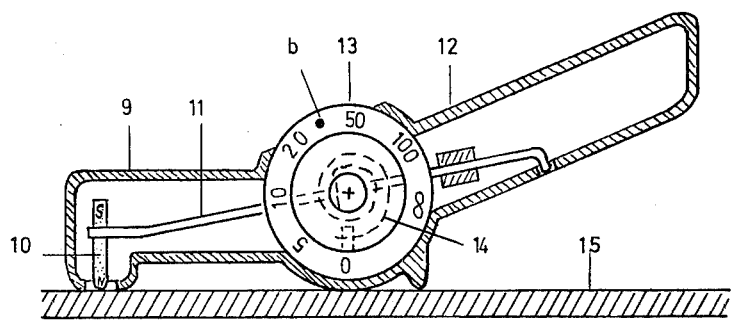
FIG. 4 is a vertical cross-section of a typical magnetic thickness gauge having a scale which is marked for calibration with a test sheet of the present invention.

FIG. 4 is a cross-section of a magnetic thickness gauge of the type disclosed in U.S. Pat. No. 3,521,160, in which the housing 9 contains a magnet 10 attached to one end of an arm 11 which is rotatably supported in the housing and also provided with a counter-weight 12 to balance the magnet. The arm 11 is connected to the rotary scale 13 by means of a spiral spring 14 so that by rotating the scale 13 in a clockwise direction, the force of the spring 14 is increased until the point is reached at which the magnet is pulled away from the test sheet 15. The scale is marked at b to indicate the correct reading on the scale for pulling the magnet 10 away from a test sheet 15 of a particular known thickness.

Once the correct location on the scale has been found for the calibration mark b by first calibrating the gauge as described in connection with FIG. 1, then for other similar gauges, it is only necessary to calibrate the gauge by using the correct test sheet and demagnetizing the magnet so that it will pull away from the test sheet at the scale reading b. Since the entire mass of the test sheet 15 acts on the magnet (there being no extraneous layer of material between the two) a certain amount of wear due to extended use will not seriously change the calibration value of the sheet. For the same reason, any roughness due to scratches on the surface of the test sheet will have little effect on the calibration.

Production of these test sheets is accordingly fairly simple, as they can easily be cut from sheets of pure nickel which has been rolled to the appropriate thickness.

Due to the fact that the location of the various values on the scale of a thickness gauge will follow a well-defined curve so that it is possible to calibrate a gauge by using only a single test sheet having a thickness suitable for comparing only the single calibration setting on the scale, it may be desirable to check several readings on the scale. This can be done by using test sheets of different thicknesses. For example, in the case of a thickness gauge of the above-noted type of construction, having a measuring range from 0 $\mu$m to 100 $\mu$m, a test sheet of pure nickel (more than 99% Ni) having a thickness of 1 mm will produce a magnetic effect on the gauge which is equivalent to that produced by the measurement of a layer 65 $\mu$m thick deposited on a soft magnetic steel base. In the case of a nickel test sheet of 0.1 mm thickness, the magnetic effect is equivalent to the measurement of an applied non-magnetic layer 900 $\mu$m in thickness. In the case of the nickel test sheet having a 1 mm thickness, it is approximately fifteen times as thick as the equivalent measured layer of 65 $\mu$m and thus the test sheet of nickel is considerably more mechanically resistant to handling than is the latter. Furthermore, other materials, such as ferromagnetic alloys having saturation magnetizations of less than 1.4 Tesla can also be used for making the test sheets of this invention.

While pure nickel has been used in the past for the calibration of magnetic balances, it has not previously been suggested for use in the calibrating of a thickness gauge.

For the calibration of instruments used in the measurement of the thickness of electrically non-conductive layers on electrically conductive bases, test sheets consisting of a material having a uniform composition throughout their thickness can be used, the criterion being that the electrical conductivity of the test sheet material should be less than the conductivity of the base material supporting the layer to be measured. Numerous materials of varying thickness are suitable for this purpose, such as brass for the calibration of thickness gauges for insulating layers on aluminum.

In a situation in which the resulting test sheet is very thin so that it will be difficult to handle, it may be mounted on a carrier, such as cardboard or plastic, which does not itself exert any influence on the measuring instrument. It should also be realized that, in the case of certain materials used for test sheets, it may be desirable to cover any exposed surfaces with a very thin protective coating against oxidation or corrosion, etc. in which case, the test sheet as a whole can be considered as having a uniform composition insofar as its effect on the measuring gauge is concerned.

What is claimed:

1. Method of calibrating magnetic thickness gauges of the type having a direct reading scale and being equipped with at least one movable magnetized pole piece for contact with a layer to be measured, said layer being supported on a base composed of a material capable of exerting force on said pole piece when said magnetized pole piece is in contact with said layer which is a function of the thickness of the supported layer, comprising the steps of placing said magnetized pole piece in contact with a test sheet composed of a material having a uniformity distributed composition throughout its thickness which exerts a lesser magnetic force on said pole piece than the same thickness of said base material, said force being the equivalent of the force exerted by said base material when supporting a layer of known thickness, and adjusting the attractive force of said pole piece to obtain the reading on said scale indicative of said known thickness.

2. The method of claim 1, wherein said base comprises a ferromagnetic material and the test sheet is composed of a material having magnetic conductivity, permeability and/or saturation magnetization having a value which is less than the corresponding value of the ferromagnetic base.

3. The method of claim 2, wherein said test sheet is made of pure nickel.

4. The method of claim 1, which includes the additional steps of substituting other individual test sheets of various thicknesses to produce magnetic influences on the pole piece equivalent to more than one thickness of material to be measured by the gauge.

5. The method of claim 1, wherein said test sheet comprises a sheet of thin material mounted upon a supporting material having a neutral magnetic influence on said gauge.

6. The method of claim 1, wherein said test sheet, comprises a sheet at least one surface of which is covered with a protective coating of a material which exerts a neutral magnetic influence on the pole piece.

7. Method of calibrating magnetic thickness gauges for measuring the thickness of a layer on a base of electically conductive material of the type wherein a magnetic pole piece to be placed in contact with the layer to be measured is energized by an adjustable electric circuit means which supplies an energizing alternating current field to said pole piece and includes a device having a direct reading scale means for measuring an electrical characteristic of said circuit means which is a function of the thickness of said supported layer when the energized pole piece is in said contact, comprising the steps of placing said energized pole piece in contact with a test sheet composed of a material of lesser electrical conductivity than said base having a uniformly distributed composition throughout its thickness and which produces a measured electrical characteristic in said circuit means which is the equivalent of the electrical characteristic produced by said base when supporting a layer of known thickness, and adjusting said circuit means to obtain the reading on said scale means indicative of said known thickness.

8. Method of claim 7, wherein the electrical characteristic to be measured by said device is voltage and said circuit means includes means to adjust the voltage supplied to energize said pole piece.

* * * * *